July 8, 1924.

F. S. TYSON

FASTENER

Filed June 11, 1923

1,500,475

WITNESSES:

INVENTOR
Frederick S. Tyson
BY
HIS ATTORNEY

Patented July 8, 1924.

1,500,475

UNITED STATES PATENT OFFICE.

FREDERICK S. TYSON, OF LOCK HAVEN, PENNSYLVANIA.

FASTENER.

Application filed June 11, 1923. Serial No. 644,592.

*To all whom it may concern:*

Be it known that I, FREDERICK S. TYSON, a citizen of the United States, residing at Lock Haven, in the county of Clinton and State of Pennsylvania, have invented certain new and useful Improvements in Fasteners, of which the following is a specification.

My invention relates to fasteners which are particularly adapted for use in fastening the meeting edges of covers which require a tight fit, such as tire covers.

The objects are to provide a fastener which will not tear the part of the cover to which it is secured when disconnecting the fastener to remove the cover; is easily and quickly connected and disconnected; will stay fastened in such a manner that it is practically impossible for it to become disconnected without the manipulation of a person, and which is simple in construction and cheap to manufacture.

These objects, and other advantageous ends which will be described hereinafter, I attain in the following manner, reference being had to the accompanying drawing in which—

Figure 1:
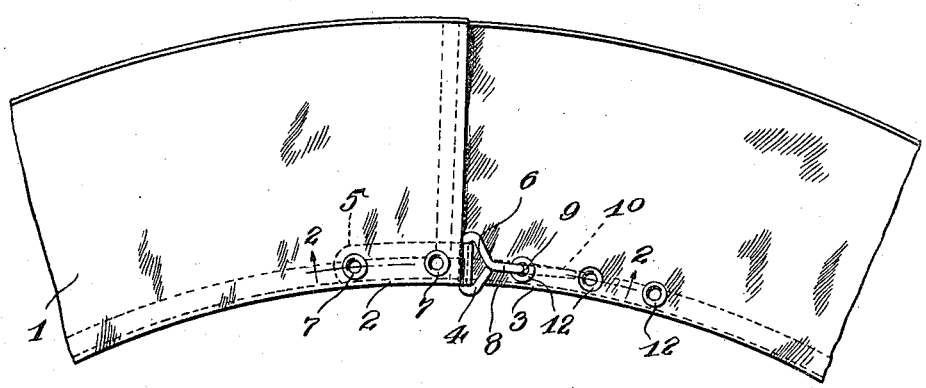
Figure 2:
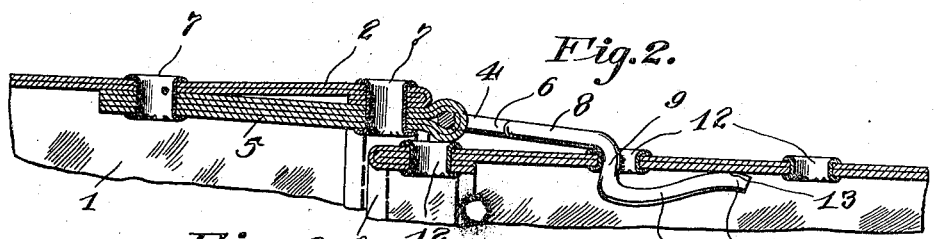
Figure 3:
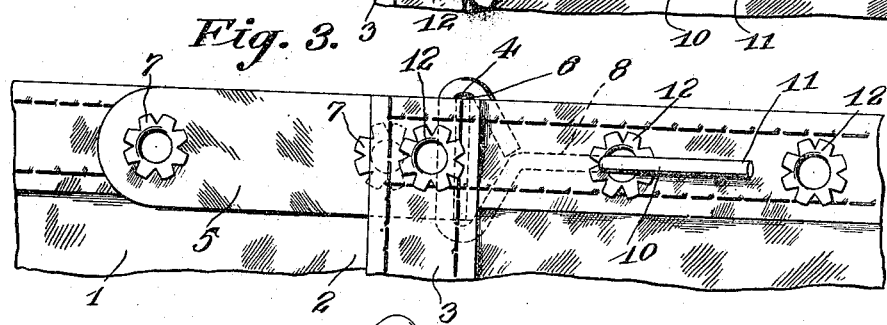
Figure 4:
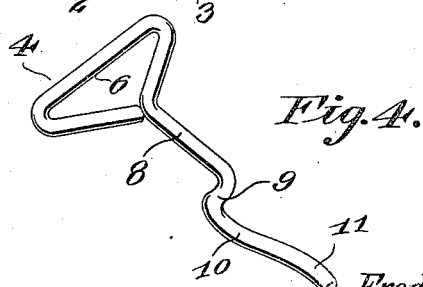

Figure 1 is a fragmentary side view of a tire cover having my invention applied thereto, Figure 2 an enlarged section on line 2—2 of Figure 1, Figure 3 a bottom plan view of Figure 2, and Figure 4 a perspective view of a hook which forms a part of my invention.

My improved fastener may be used for fastening any type of meeting edges and for illustration I have shown it applied to the meeting edges of a tire cover.

In the drawing, 1 indicates a tire cover having the end 2 overlapping the end 3. A hook 4 is secured to the end 2 in any suitable manner, preferably by a strap 5 passing through an attaching eye 6 of the hook and riveted to the end 2 by eyelets 7 or the like. The hook is preferably made from tough wire and consists of a body part 8 having a downwardly bent locking part 9 which in turn merges into an outwardly and upwardly bent part 10 having its end 11 bent slightly downward so that a rounded end will engage the cover and thus prevent the end from cutting or wearing its way through the cover.

The end 3 of the cover is provided with a series of eyelets 12 adapted to receive the hook 4 for fastening the two ends of the cover together. The eyelets may be of any suitable type, either metallic or knitted. The series of eyelets make the cover adjustable to fit different size tires.

To apply a tire cover, having my improved fastening means thereon, to a tire the cover is placed around the tire in the usual manner and its ends overlapped and pulled together tightly until the hook 4 reaches an eyelet 12. The end 11 of the hook is then passed through the eyelet and forced under the cover until the part 10 is completely under the cover and the bent part 9 falls into the eyelet. The hook is then locked and held in the eyelet by the engagement of the eyelet with the body 8 and bent part 9 and the engagement of the end 11 of the hook with the under side of the cover as shown at 13 in Figure 2.

A similar hook and series of eyelets are secured to the other side of the cover and fastened in the manner above described. Thus the ends of the cover are tightly fastened and held together by the fasteners so that it is practically impossible for the fasteners to become disconnected unless manipulated by a person.

To remove the cover from the tire, the fastener is disconnected by forcing the eyelet away from the body part 8 and sliding it downward on the bent part 9 until it engages the part 10, then by a slight pulling upward of the hook, the part 10 will slip out of the eyelet. The other side of the cover is similarly disconnected and the cover removed from the tire.

By constructing a fastener as above described the eyelet or hook is not torn away from the cover when connecting or disconnecting the same; and the outwardly and upwardly bent part 10, being in engagement with the cover as shown at 13, prevents the hook from slipping out of the eyelet and yet permits easy and quick connection and disconnection of the hook and eyelet.

While I have described my invention as taking a particular form, it will be understood that the various parts of my invention may be changed without departing from the spirit thereof, and hence I do not limit my self to the precise construction set forth, but consider that I am at liberty to make such changes and alterations as fairly come within the scope of the appended claims.

Having thus described my invention, what I claim as new and desire to secure by Letters Patent is:—

1. A fastener including a hook having its end bent outwardly and upwardly to extend beyond the length thereof, and an eyelet for receiving the hook, the highest point on the end of the hook extending beyond the body of the eyelet.

2. A fastener including a hook having an attaching eye on one end and its other end bent outwardly and upwardly, and an eyelet for receiving the hook, the bent end of the hook extending beyond the body of the eyelet.

3. A fastener including a hook consisting of a body having an attaching eye on one end, a downwardly bent hooking part on the other end substantially at right angles thereto and an upwardly and outwardly bent locking part extending from the hooking part, and an eyelet for receiving the hooking part, the locking part extending beyond the body of the eyelet.

4. A fastener including a hook consisting of a body having an attaching eye on one end, a downwardly bent locking part on the other end substantially at right angles thereto, an upwardly and outwardly bent locking part extending from the hooking part and a downwardly bent end on the locking part, and an eyelet for receiving the hooking part, the downwardly bent end of the locking part extending a distance beyond the body of the eyelet.

5. A cover fastener including a hook secured to one edge of the cover, and an eyelet secured to the other edge of the cover for receiving the hook, the hook having its end bent outwardly and upwardly to extend beyond the length of the body of the eyelet and engage the cover.

In testimony whereof I have signed my name to this specification in the presence of two subscribing witnesses.

FREDERICK S. TYSON.

Witnesses:
B. F. GEARY,
J. FLORENCE BITNER.